Aug. 15, 1961   L. K. JENSEN   2,996,204
ATTACHMENT DEVICE FOR INDUSTRIAL TRUCK
Filed May 27, 1959   4 Sheets-Sheet 1

INVENTOR.
Lester K. Jensen.
BY
Attorney.

Aug. 15, 1961  L. K. JENSEN  2,996,204
ATTACHMENT DEVICE FOR INDUSTRIAL TRUCK
Filed May 27, 1959  4 Sheets-Sheet 3

INVENTOR.
Lester K. Jensen
BY J. C. Wiessler
Attorney.

INVENTOR.
Lester K. Jensen.
BY
Attorney.

United States Patent Office 2,996,204
Patented Aug. 15, 1961

2,996,204
ATTACHMENT DEVICE FOR INDUSTRIAL TRUCK
Lester K. Jensen, Battle Creek, Mich., assignor to Clark Equipment Company, a corporation of Michigan
Filed May 27, 1959, Ser. No. 816,294
6 Claims. (Cl. 214—514)

My invention relates generally to an attachment device for industrial trucks and more particularly to improvement in an attachment which is adapted to draw a sheet-like pallet on which a load is disposed onto a load supporting member of the truck and to push the load off of said member, together with means for retaining the pallet on the load supporting member when the load is discharged therefrom.

The present invention constitutes an improvement on the device disclosed in co-pending U.S. application Serial No. 636,682, filed January 28, 1957, now Patent No. 2,955,721 in the names of Hepler and Johnson (common assignee).

In handling material on a sheet-like pallet the operator may frequently desire to retain the pallet upon the load supporting surface while separating the load from the pallet, as, for example, when the load is discharged into a box car, truck or the like for transport to a distant destination.

In carrying out the invention of the above co-pending application there is provided a load supporting means and a load pusher device which is supported by the load supporting means and which is adapted to be actuated longitudinally in either direction of the load supporting means with or separate from a clamping jaw mechanism. The clamping jaw mechanism is so constructed as to be alternately and selectively connectible to the load pusher and to the load supporting means such that it may first be actuated outwardly of the supporting means with the pusher rack to engage the marginal edge of a sheet-like pallet upon which is disposed a load, and then actuated rearwardly with the pusher rack to draw the load and pallet upon the supporting means, following which the pusher rack may be again actuated outwardly of the supporting means while the clamping jaw mechanism remains in its rearward or clamping position thereby permitting the load to be pushed from a pallet by the rack while the pallet is retained upon the supporting means by the clamping jaw mechanism. Alternatively, the clamping jaw mechanism when in its rearward position may be actuated from its connection with the supporting means to connection with the load pusher, whereupon subsequent actuation of the load pusher outwardly of the supporting means will effect like movement of the clamping means and a discharge from the supporting means of both the load and the sheet-like pallet. In addition, hydraulic control means is provided in the device of the aforementioned co-pending application for permitting remote operator control of all movements of the various parts of the device for carrying out the foregoing sequences of operation, including automatically operable means which actuates the clamping jaw mechanism out of gripping relation to the sheet-like pallet whenever the operator initiates lateral shifting movement in either direction of a portion of the load supporting means.

In the handling of certain articles on such sheet-like pallets with the above device, it has been found that a problem is sometimes encountered in that portion of the operation of the device wherein the pusher rack is actuated outwardly of the supporting means to push a load from the pallet while the clamping jaw mechanism is retained in its rearward or clamping position for retaining the pallet upon the supporting means. In the handling of bagged material, for example, wherein the depth of each bag may be approximately equal to the dimension between the lower edge of the pusher rack and the upper surface of the load supporting means, it has been found that during performance of the latter operation the lower transverse row of bagged material tends to become wedged or caught between the pusher rack and load supporting member with damage or loss oftentimes resulting to that portion of the load. I have conceived a solution to the problem which provides a drop-plate construction associated with the clamping jaw and with the pusher rack and operable to follow vertical movements of the clamping jaw mechanism whenever it is located adjacent the pusher rack and to move outwardly with the rack and immediately above the load supporting platform when the pusher rack is separated from the clamping jaw mechanism, as during a pallet retention operation.

It is a principal object of the invention to provide an improved device for handling material by means of an industrial truck wherein a sheet-like pallet and load may be efficiently separated during discharge of the load from a load supporting surface, the pallet being retained on the supporting surface.

Another object of the invention is to provide in a device of the nature contemplated means to prevent damage to a portion of a load when the load is being separated from the device.

Other objects, features, and advantages of the invention will become apparent from the following description when taken in conjunction with the accompanying drawings wherein:

FIGURES 1, 2, 3 and 4 comprise a series of schematics which illustrate a normal sequence of operation of the device;

Figure 1:
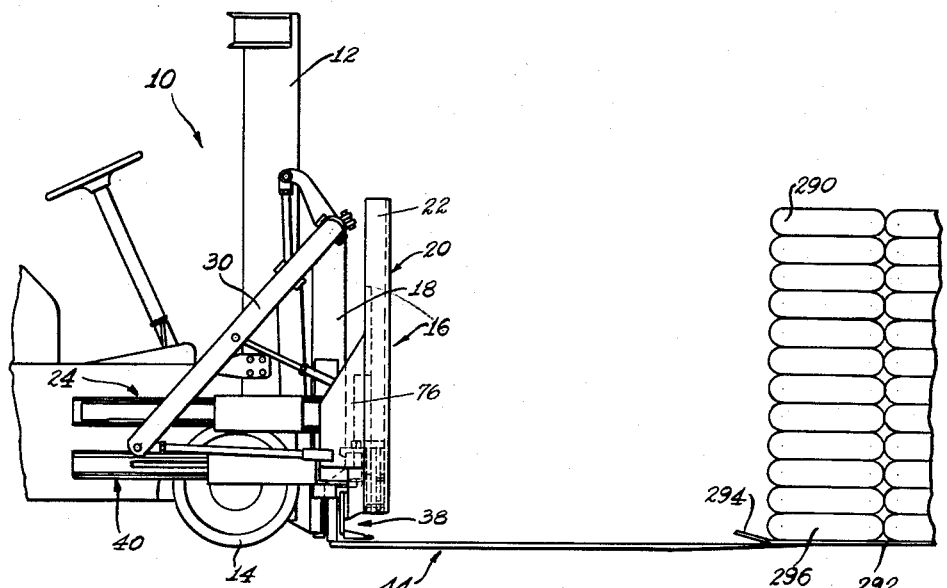

Referring now in detail to the drawings, the forward portion of an industrial lift truck of known construction is shown generally at numeral 10. It includes known telescoping lifting mast construction 12 which is pivotally mounted for tilting movement in a fore and aft direction about the housing of a front drive axle, not shown, which axle drives a pair of traction wheels, one of which is shown at numeral 14.

The improved device of my invention is embodied in the device shown generally at numeral 16 which comprises an attachment of the truck 10. The device 16 comprises generally a rectangular and vertically extending supporting framework 18 (shown in side view in the drawings) which is adapted to be elevated relative to the lifting mast 12; a load pusher assembly 20 which includes a transversely extending rack member 22 connected to the supporting frame assembly 18 by means of a pair of longitudinally extending and laterally spaced telescoping channel assemblies 24 (one of which is shown) located on opposite sides of the machine for fore and aft movement, and connected to a power actuated crank assembly 28 which includes a pair of laterally spaced crank arms 30 (one of which is shown), located outwardly of opposite sides of mast construction 12 and rotatably actuatable in either direction with a connecting shaft upon energization of a pair of laterally spaced hydraulic cylinder assemblies 36 (one of which is shown); a generally L-shaped load supporting assembly 44 which includes the framework 18 and a lifting carriage which is mounted for vertical movement in lifting mast 12; and a jaw and jaw frame assembly or clamping means 38 which is selectively connectible either to the load pusher device 20 or to the load supporting assembly 44 or truck frame and which is also continuously connected to the framework 18 by means of a pair of longitudinally extending and laterally spaced telescoping channel assemblies 40 (one of which is shown).

The device 16 per se does not comprise the present invention, except insofar as certain elements thereof are combined with the drop-plate construction of this invention, to be described, and the foregoing device will therefore be only generally described herein. A more detailed description thereof will be found in the aforementioned co-pending application.

Figure 5:
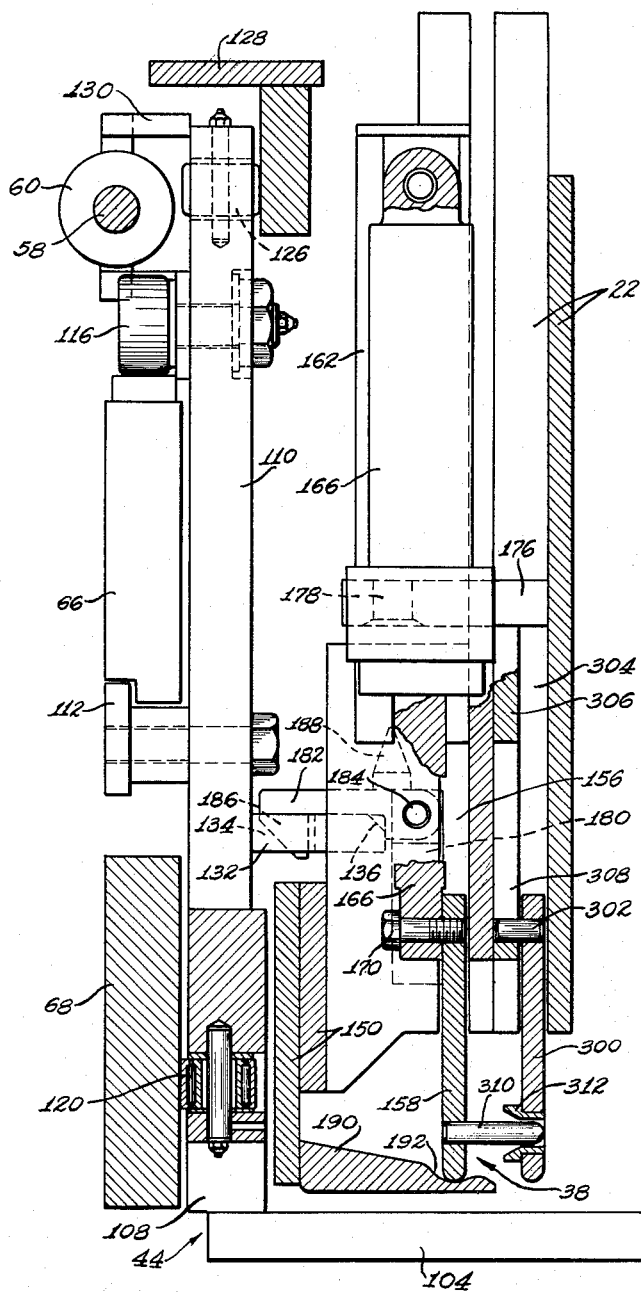
FIGURE 5 is a view taken in longitudinal section through the pusher rack, clamping mechanism and mounting means of the device.
Figure 7:
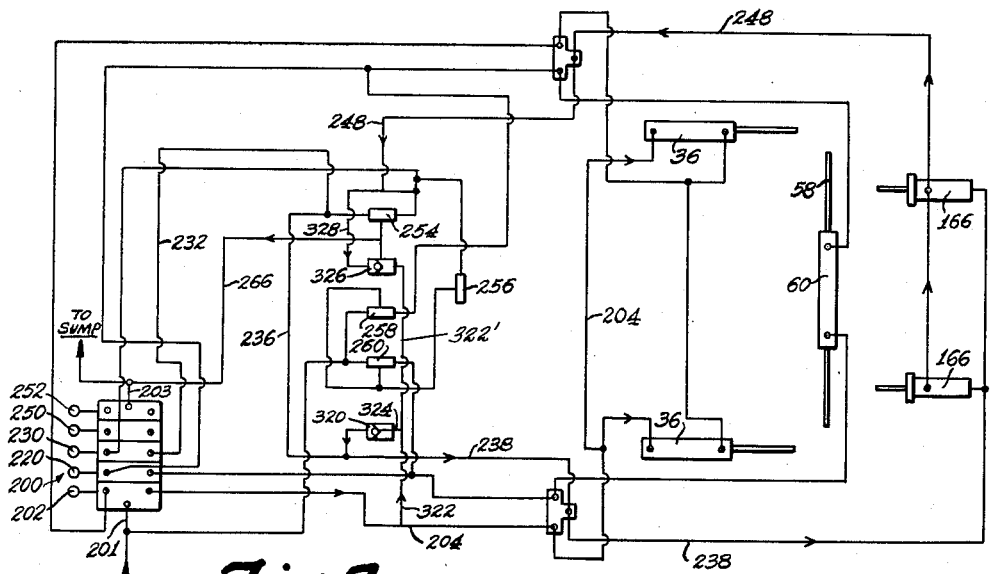
FIGURE 7 is a schematized diagram of hydraulic control circuitry for operating the device.

The above mentioned elevatable supporting framework 18 includes a transversely extending fixed piston rod 58 of a laterally movable hydraulic cylinder assembly 60 (FIGURES 5 and 7). Coplanar mounting plates 66 and 68 are suitably secured to opposite sides of framework 18 and are also connected to lift brackets, not shown, of well known type, which are mounted in the lifting mast 12 for vertical movement. Such movement effects corresponding vertical movement of the entire device 16.

The rack 22 of the load pusher assembly 20 includes a pair of side plate members 76 located on opposite sides thereof and rigidly attached to an inner slide or channel member 78 of each telescoping channel assembly 24 and to a rod member 80 which is pivotally connected to each plate 76 and to the one end of each crank arm 30. Channel member 78 is slidable within each intermediate channel member 82 which is connected to the center portion of each crank arm 30 by means of an adjustable pivot rod 86. Each channel member 82 is slidable longitudinally within a fixed outer channel member 88 which is connected to the one side of framework 18 by means of a plate 90.

If cylinder assembly 36 is energized to effect extension thereof, it acts through the crank assembly 28, crank arm 30 and rods 80 and 86 to actuate pusher assembly 20 rearwardly as the crank arm 30 rotates to effect an inward telescoping movement of the channel members of assembly 24. When the pusher assembly 20 is in a fully retracted position, as shown in FIGURE 1, the rack 22 is spaced forwardly from the supporting framework 18 only by the width of the clamping means 38.

The laterally movable portion of the load supporting assembly 44 comprises a pair of transversely spaced and forwardly extending platens 104 (one of which is illustrated) connected to a transverse plate 108 which is secured to a transverse side shifting plate 110 (FIGURE 5). Plate 110 is mounted with platens 104 for side shifting movement in either direction within the confines of the laterally spaced ends of the supporting framework 18 of assembly 44. Plate 110 is mounted upon the supporting or carriage plate 66 by means of suitably arranged brackets 112 in registry with the carriage plate and by laterally spaced rollers 116, one of each of which is shown, connected to the plate member 110 and supporting same in relative rolling engagement with the upper edge of carriage member 66. Roller sets 120 and 126 are suitably located between members 110 and 68 and between member 110 and an inverted L-shaped frame member 128 also of framework 18, respectively. The movable portion of load supporting assembly 44 is held against vertical movement relative to carriage 66, 68 by means of rollers 116 and brackets 112, and is held against tilting movement relative to the carriage by means of roller sets 120 and 126.

The side shift cylinder 60 has secured at the center portion thereof a yoke assembly 130 which is also secured to the rear surface of plate member 110. Movement of cylinder 60 to the right or to the left along piston rod 58 therefore effects like movement of load supporting assembly 44 relative to other parts of the device 16.

Mounted upon the forward surface of plate member 110 is a forwardly and transversely extending member 132 having a transversely extending slot 134 in the rear portion thereof and a chamfered edge 136 at the forward edge thereof. Member 132 is adapted to be engaged by a latch or dog member of the jaw and jaw frame assembly 38, in a manner to be described, for retaining said assembly adjacent the framework 18 under certain conditions.

Figure 6:
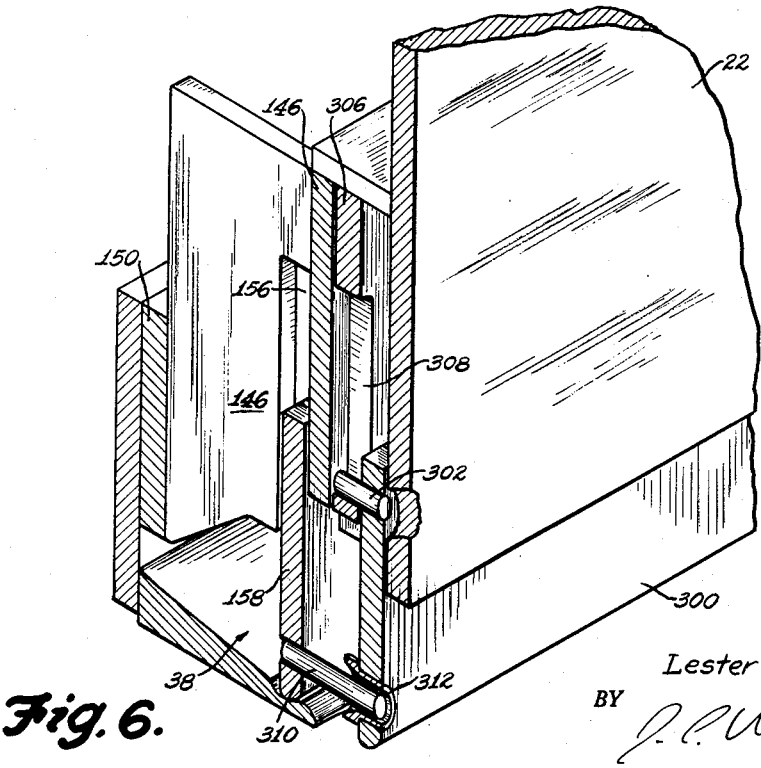
FIGURE 6 is a broken-away sectional view in perspective of the pusher rack and clamping jaw mechanism embodying my invention.

The clamping mechanism or jaw and jaw frame assembly 38 will now be somewhat generally described with particular reference to FIGURES 5 and 6. The lower telescoping channel assembly 40 located on each side of the vehicle is similar in construction to channel assembly 24, and comprises an outer fixed channel 140, an intermediate channel member 142, and an inner slide member 144 which is connected to a rearwardly opening and generally U-shaped jaw frame member 146 which extends transversely of the vehicle. The open ends of the legs of member 146 are connected together by plate 150. Intermediate the legs of member 146 and the base member thereof is formed a slot 156 which receives the transversely extending reciprocable clamping or jaw blade 158. A pair of inverted U-shaped cylinder support members 162 (one of which is illustrated) are supported from the base of jaw frame member 146; pivotally connected to each support member is a hydraulic cylinder assembly 166. The piston rod of each assembly 166 is connected to the jaw blade 158 by means of a bolt 170. A transversely extending jaw shoe 190 is secured along and adjacent to the lower transverse edge of plate 150 and is tapered forwardly from its connection with the plate member, as shown. A transverse groove 192 is adapted to receive therein the lower curved edge of jaw blade 158. The jaw shoe 190 of the jaw and jaw frame assembly is disposed just above the upper surfaces of platens 104.

An element 176 is secured to and extends rearwardly from pusher rack 22, the element being centrally located relative to the rack at a position near the bottom thereof. The element 176 defines a vertically extending opening 178 therein. Immediately below the element 176 and connected to a mounting bracket 180 is pivotally mounted on a pin 184 a dog or latch member 182. The latch 182, as shown, is gravity loaded on pin 184 toward a horizontal position but may be spring loaded if desired. The after end of latch 182 comprises a downwardly depending leg 186 which has the rear face thereof formed at an angle equal to the angle of the chamfered edge 136 of member 132. Secured to the upper surface of latch 182 and adjacent pin 184 is an upwardly extending needle-like pin 188 which is located so as to be registrable with opening 178 of element 176 whenever the cylinder assembly 166 is energized to actuate upwardly jaw blade 158 in slot 156. Since the element 176 is connected to the rack 22 and the latch assembly 180, 182 is secured to the jaw blade 158, said jaw being in turn effectively secured by means of cylinder assemblies 166 and associated frame member to the jaw frame assembly, it will be seen that upward movement of the jaw blade 158 in slot 156 will effect a positive connection between the clamping means 38 and the load pusher assembly 20 as a result of the registry of connecting pin 188 in opening 178. Therefore, whenever the jaw blade 158 is in its up position in slot 156 the entire jaw and jaw frame assembly 38 becomes, in effect, a part of the load pusher assembly 20, and will, therefore, move outwardly toward the forward end of platens 104 with the pusher assembly 20 upon retraction of cylinder assemblies 36. If, at the position shown in FIGURE 2, the jaw blade 158 is actuated downwardly in slot 156 so as to disengage the pin 188 from the opening 178, then the entire jaw and jaw frame assembly 38 is disconnected from the pusher assembly 20. However, extension of the cylinder assembly 36 from the position shown in FIGURE 2 to that of FIGURE 3 will effect rearward movement of the assembly 38 along with the assembly 20 as a result of abutment between the front surface of frame member 146 and the backside of rack 22. As the rack 22 approaches its rearwardmost position (FIGURES 3 and 5) the downwardly depending leg 186 of latch 182 engages the forward chamfered edge of member 132 which causes the latch to pivot upwardly about pin 184 and then slide rearwardly along the upper surface of member 132 until it drops into slot 134. Therefore, whenever the jaw and jaw frame assembly 38 is in its rearward position and the jaw blade 158 is down, the position of said assembly is fixed with respect to the load supporting assembly 44. So long as the jaw is maintained in its downward position the assembly 38 will remain in the position shown in FIGURE 5, while the load pusher assembly 20 may be actuated forwardly and rearwardly relative to the rest of the attachment 16. If, on the other hand, when the assemblies 20 and 38 are in the relative positions shown in FIGURE 5 and the jaw blade 158 is actuated upwardly to connect assembly 38 with assembly 20, subsequent full retraction of cylinder assemblies 36 will effect unitary outward movement of said assemblies to the position shown in FIGURE 2.

Referring now to FIGURE 7, there is illustrated a schematized plan view of hydraulic control means for operating the load pusher assembly 20, the side shifting portion of the load supporting assembly 44, and jaw blade 158. A control lever bank 200 is located in the operator's compartment for convenient selective control of the various fluid pressure actuated parts and assemblies. The bank of control levers receives pressure fluid from the discharge side of a pump, not shown, through the conduit 201 and is adapted to discharge all or a part of said fluid through a conduit 203 to a sump, not shown.

A lever 202 controls the double-acting pusher assembly cylinders 36, which are connected in parallel and which receive through suitable conduits pressure fluid for actuating the pusher assembly 20 in either extension or retraction.

A lever 220 controls the position of side shift cylinders 60 along piston rod 58 for actuating, as hereinbefore described, the movable portion of the load supporting assembly 44 rightwardly or leftwardly within the framework portion 18 thereof.

A lever 230 is connected by suitable conduits to jaw blade cylinders 166 to control extension and retraction thereof, and thereby closing and opening movements of jaw blade 158.

A tilt control lever 250 is provided for initiating fore and aft tilting of the attachment 16 with mast assembly 12 about the front axle by cylinder means, not shown, and a lift control lever 252 is provided for initiating raising and lowering movements of the attachment on the mast by means of a well known hoist cylinder assembly, not shown.

Whenever any one of the hydraulic cylinders which is controlled by any of levers 202, 220 or 230 is actuated in one direction, fluid from the opposite end of any such cylinder will be discharged to the sump through line 203 and that end of the valve of the lever bank which is opposite to the lever position selected. Of course, if any one of the levers in the control bank 200 is located in a neutral position the fluid will not flow to the cylinders controlled thereby which will remain in selected position.

Four spring loaded ball check valves 254, 256, 258 and 260 are provided to come into operation in a predetermined sequence in the event that the side shift lever 220 is actuated to either of its active positions while the jaw blade 158 is down. The various check valves are connected in the hydraulic circuits of cylinder 60 and cylinders 166 in such a manner that the jaw blade will be automatically raised whenever side shift lever 220 is actuated out of its neutral position. It will be understood that if a side shifting operation of the movable portion of load supporting assembly 44 could be accomplished while the jaw blade 158 is in engagement with the shoe 190 and a sheet-like pallet, a tearing of the pallet would occur at edge 294 thereof, which would make it unfit for further use. Such attempted side shifting with the jaw blade down may naturally occur either following initial engagement of the pallet by the jaw blade preparatory to loading same upon the load platens, or preparatory to or during an unloading operation. A detailed description of the circuitry which accomplishes this function is unnecessary to an understanding of the present invention, and so need not be amplified further herein. Reference may be made to the above identified co-pending application for complete details. Provision has been made in the hydraulic circuitry of FIGURE 7 to perform an important additional function which constitutes a part of this invention. The additional circuitry will be described hereinbelow.

Referring now to FIGURES 1 through 4, there is illustrated a typical operating sequence of the device as presently described. In FIGURE 1 is illustrated the normal inactive position of the device in which no load is carried by the load supporting assembly 44. In the position of the device as here shown, the load pusher assembly 20 is positioned adjacent the clamping means 38, and said clamping means is positioned adjacent the vertical portion of assembly 44, the blade 158 being in its up position in which it is detached from member 132 of assembly 44 and attached to member 176 of assembly 20 by pin 188.

Figure 2:
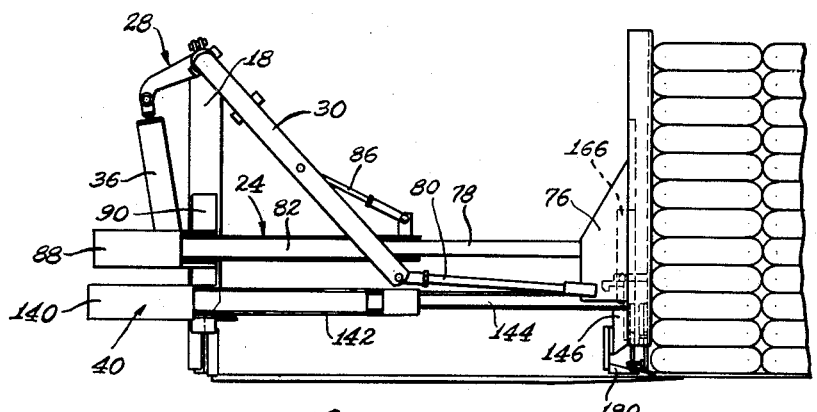

If the truck operator desires to engage a load upon platens 104 he first drives the truck to a position adjacent one side of the load 290, which has previously been unitized upon a flexible pallet 292 of well known type, one edge of which pallet preferably projects slightly upwardly and outwardly from said side of the load as indicated at numeral 294. If the truck is not properly aligned to pick up the load, cylinder 60 may be energized to shift the movable portion of load supporting assembly 44 either to the right or to the left. Control lever 202 is then actuated to cause the piston rods of cylinders 36 to retract and actuate the crank assembly 28 outwardly toward the load which effects concurrent outward movement of the load pusher and clamping assembly 20 and 38. With the load platens 104 flat on the floor and the attachment positioned as shown in FIGURE 2 the cylinders 166 are energized to actuate jaw blade 158 downwardly into holding engagement with the groove 192 in shoe 190, thereby gripping intermediate the jaw blade and shoe the outwardly extending edge 294 of the pallet. Subsequent opposite energization of cylinder assemblies 36 effects a rearward movement of the load pusher and clamping assemblies to the position illustrated in FIGURE 3 in which the load 290 has been drawn onto the platens 104 with the pallet 292 as a result of the gripping action between the jaw blade and shoe on edge 294 of the pallet. As previously described the assembly 38 becomes attached to the load supporting assembly 44 by means of latch 182 and slotted member 132 whenever the clamping assembly is positioned adjacent the load supporting assembly and the jaw 158 is down.

With the load 290 now fully engaged by platens 104 it can be transported by the truck to any desired location, lifted to any desired elevation within the range of lifting mast 12, and tilted forwardly or rearwardly with the attachment 16 and the mast 12 for aiding unloading or transport thereof. When the truck has been driven to the location desired for unloading, the operator may elect whether to discharge the load and pallet 290 and 292 together or to separate the load 290 from the pallet 292 by retaining the pallet on the platens and discharging the load therefrom. In many cases, the operator will elect to retain the pallet on the load platens so it can be subsequently used. If the operator decides to retain the pallet while discharging the load he merely allows the jaw blade 158 to remain in its down position and energizes the cylinder assemblies 36 to actuate the crank assembly 28 and pusher rack assembly 20 outwardly to the position shown in FIGURE 4, in which the load 290 has been pushed from the pallet 292 by the now extended load pusher assembly, said pallet being retained upon the load platens assembly 38 which remains secured to the load supporting assembly 44 as aforesaid. From the position illustrated in FIGURE 4 the load pusher and clamping assemblies may be returned to the positions shown in FIGURE 1, in which the attachment is ready for another loading and unloading operation as above described.

Figure 3:
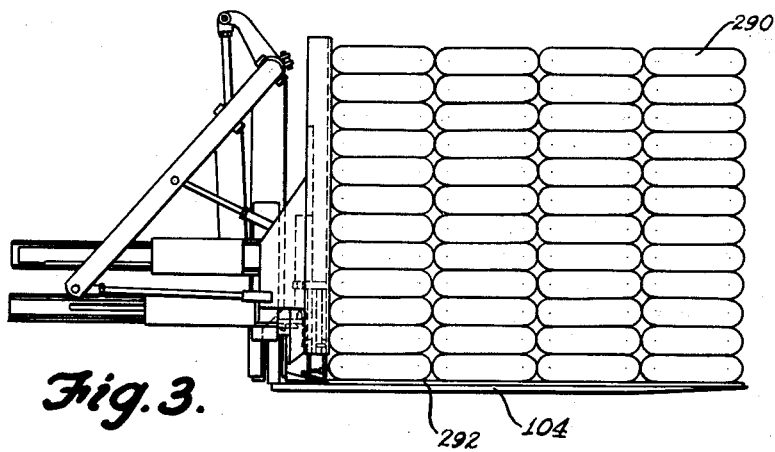
Figure 4:
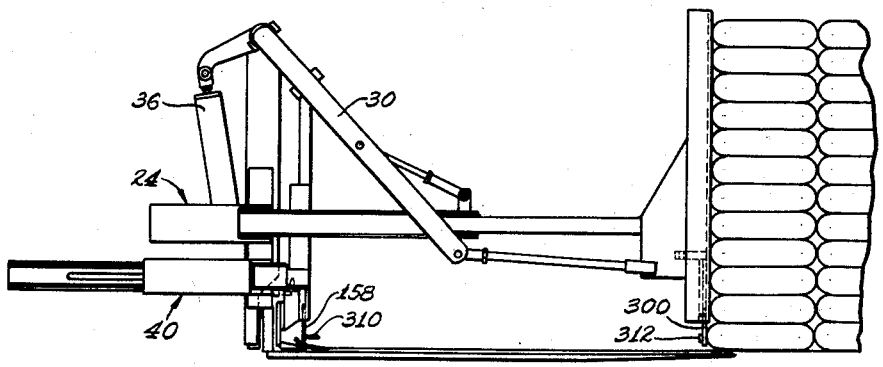

In the event that it is not desired to separate the load from the pallet as in FIGURE 4, the jaw blade 158 may be raised in FIGURE 3 to disengage same from assembly 44 and engage same with assembly 20 (FIGURE 1), thereby releasing the marginal edge 294 of the pallet, following which pusher assembly 20 and clamping assembly 38 may be operated together to discharge the load and pallet from the platens. The latter mode of operation may be desirable in the case where it is desired to later pick up and transport the same load to another location, in which case the load 290 remains unitized upon the pallet 292 for subsequent transport.

It will be understood that the upper surfaces of load platens 104 are polished so as to minimize the coefficient of friction between the platens and the lower surface of pallet 292, so that the load 290 always remains with the pallet 292 unless movement of the pallet is inhibited by the clamping assembly 38.

It has been found in practice that in the use of the device as above described the lower transverse row of articles of a load, such as that shown at numeral 296, sometimes become damaged as a result of a tendency to wedge beneath pusher rack 20 when the rack is actuated outwardly of platens 104, as in FIGURE 4, wherein jaw blade 158 remains in a pallet retaining position.

My invention provides a drop plate construction 300 which extends above and transversely of platens 104 and which is mounted upon stop members 302 located at opposite sides of the drop plate. A transversely extending slot 304 is located between a plate member 306, which is a part of pusher rack 20, and forward plate 22 of the rack, the end edges of plate 306 having vertical slots 308 formed therein for reception of stop members 302, only one of which is illustrated, whereby drop plate 300 is movable upwardly and downwardly within space 304 a distance which is limited by the length of slot 308. A pin 310 is secured to the lower outer edge portion of each side of jaw member 158 and extends forwardly thereof. An opening is formed by a rearwardly flared receiver plug 312 which is located in the lower portion of each side of drop plate 300 in axial alignment with the adjacent pin 310.

Whenever pusher rack 20 and clamping mechanism 38 are located adjacent one another with the jaw member 158 in its down position each pin member 310 will be in registry with the adjacent receiving member 312, as illustrated in FIGURES 5 and 6. If cylinders 166 are now energized to raise jaw blade 158, drop plate 300 will be actuated upwardly therewith by pin members 310 as the upper portion of the drop plate is guided in the space formed intermediate the forward pusher rack plate 22 and plate 306 while each stop member 302 moves upwardly in its slot 308. Separation of the pusher rack from the clamping mechanism, as during the pallet retention operation described above relative to FIGURE 4, causes receiving member 312 to be moved out of registry with pin members 310 as the drop plate 300 is actuated outwardly with the pusher rack as in FIGURE 4.

During the sequence of operation described above relative to FIGURES 1 and 2, it will be apparent that the drop plate 300 follows the movement of jaw member 158 so that, as illustrated in FIGURE 1, both the drop plate and jaw member are located in a recessed position within the clamping and pusher assemblies which are secured together by pin member 188 and bracket 176. It will be seen that the drop plate cannot interfere with the operation illustrated in FIGURE 2 since it fully clears edge portion 294 of the pallet as the clamping and pusher assemblies move over the edge portion, subsequent to which the jaw member 158 is moved downwardly to clamp pallet edge 294 for pulling load 290 onto the platens as illustrated in FIGURES 2 and 3. The drop plate, of course, follows the movements of the jaw blade at all times excepting during separation of the pusher rack from the clamping mechanism (FIGURE 4).

Referring again to FIGURE 7, the invention also provides a valving mechanism in the hydraulic circuitry which automatically causes jaw member 158 to be lowered to clamping position in the event the operator begins to retract the pusher rack from an extended position and with member 158 raised. The automatic lowering movement of the jaw member under the above stated condition is of importance in that it allows no room for error on the part of the operator as, for example, in attempting to retract the pusher rack without first lowering the jaw member. Without the provision of hydraulic mechanism, to be described, the latter action would cause drop plate 300 to hit pin member 310 with considerable force upon full retraction of the pusher rack, thereby causing damage to and/or jamming the mechanism.

A one-way check valve 320 is connected in the hydraulic circuit and is spring loaded in a direction which permits flow of pressure fluid only from a conduit 204, which connects pusher rack valve 202 to the base end of pusher cylinders 36, to a conduit 238, which connects the opposite end of valve 220 to the base end of jaw blade cylinders 166. Under the aforementioned conditions, pilot valve 254 is closed and no fluid is able to flow through conduits 232 and 236 inasmuch as the jaw valve control 230 is located in neutral position with the jaw blade raised. If, therefore, the operator attempts to retract the pusher rack with the jaw blade raised pressure fluid will flow through conduit 204 into cylinders 36 causing the rack to begin to retract. At the same time pressure fluid will flow through conduits 322 and 324 into and through check valve 320 and conduit 238 to the upper ends of the jaw blade cylinders 166 causing member 158 to be lowered. Receiving members 312 are therefore aligned with pin members 310 whenever the pusher and clamping mechanisms are adjacent each other.

In order that fluid may be ejected from the lower ends of cylinders 166 there is provided an additional check valve 326 which is spring loaded to close rightwardly, as illustrated. Valve 326 communicates with the sump by way of a conduit 266 and with the piston rod ends of cylinders 166 by way of conduits 248 and 328. Valve 326 is normally closed, but will open under the aforementioned condition wherein pressure fluid flows through conduit 322 to open valve 320 and is also applied to valve 326 to open same through a static pressure line extension 322', thereby permitting fluid to be ejected from the rod ends of cylinders 166 as aforesaid to the sump through the valve 326 and conduit 266.

From the foregoing it will be seen that my invention provides a significant improvement in the operation of attachment devices of the type contemplated wherein the drop blade construction and associated mechanism permits uninhibited operation of the attachment device in any sequence, as above described, while providing means which prevents damage to portions of a load being handled.

Although only one embodiment of my invention has been described in detail, it will be apparent to persons

I claim:

1. In a device for separating a load from a sheet-like pallet having a generally L-shaped platform means, pusher means actuatable longitudinally of the platform means for discharging loads therefrom, clamping means intermediate the pusher and platform means and selectively operable to be connected with the pusher means for longitudinal movement therewith and for gripping a portion of such a pallet adjacent the outer end of the platform means in such a manner that the pallet and load may be drawn onto the platform means by actuating the pusher means and clamping means rearwardly thereof, and means associated with the platform means and the clamping means for disconnecting the clamping means from the pusher means and connecting it to the platform means, the improvement comprising drop plate means connected to and extending longitudinally of said pusher means in downwardly depending relation during actuation of the pusher means forwardly of the platform means and separate from said clamping means.

2. An improvement in devices as claimed in claim 1 wherein said clamping means is operatively connected to said drop plate means whenever the pusher means is located adjacent the clamping means, and said clamping means is operable to actuate the drop plate means upwardly relative to the pusher means.

3. In a load handling attachment for an industrial truck having a load supporting assembly supported by the truck at one end thereof, a power driven load pusher assembly supported by the truck and mounted for independent longitudinal movement relative to the load supporting assembly and clamping means also supported by the truck independently of said load pusher assembly and selectively securable to said load pusher assembly for movement therewith, the improvement comprising drop plate means depending downwardly from the load pusher assembly and elevatable therein by the clamping means when the clamping means is located adjacent the load pusher assembly.

4. Improvement in load handling attachment as claimed in claim 3 wherein said clamping means includes means extending outwardly therefrom in the direction of said drop plate means, said latter means being registrable with the drop plate means in which condition said clamping means and drop plate means are movable upwardly and downwardly together, movement of said load pusher means independently of the clamping means causing the drop plate means to move out of registry with said latter means.

5. Improvement in load handling attachment as claimed in claim 3 wherein first hydraulic cylinder means are provided for raising and lowering the clamping means, second hydraulic means are provided for extending and retracting the load pusher assembly, and third hydraulic means operatively interconnecting said first and second hydraulic means including valve means operable upon retraction of the load pusher assembly to operate said cylinder means in a direction to lower the clamping means.

6. Improvement in load handling attachment as claimed in claim 4 wherein first hydraulic means operates said clamping means, second hydraulic means operates said load pusher assembly, and third hydraulic means operatively interconnect said first and second hydraulic means, said third hydraulic means including valve means operable upon operation of the second hydraulic means to retract the load pusher assembly to apply fluid pressure to the first hydraulic means whereby to actuate the clamping means downwardly for horizontal alignment with said drop plate means.

References Cited in the file of this patent

UNITED STATES PATENTS

| | | |
|---|---|---|
| 2,590,355 | Turner et al. | Mar. 25, 1952 |
| 2,601,932 | Turner | July 1, 1952 |
| 2,955,721 | Hepler et al. | Oct. 11, 1960 |